(12) United States Patent  
Stevenson

(10) Patent No.: US 7,068,740 B2  
(45) Date of Patent: Jun. 27, 2006

(54) PROCESSING OF MODULATED SIGNALS

(75) Inventor: Carl R. Stevenson, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 792 days.

(21) Appl. No.: 10/134,984

(22) Filed: Apr. 29, 2002

(65) Prior Publication Data

US 2003/0202620 A1    Oct. 30, 2003

(51) Int. Cl.
*H03D 3/00* (2006.01)
*H03B 17/00* (2006.01)

(52) U.S. Cl. .................................. 375/334; 455/226.1

(58) Field of Classification Search ................ 375/334, 375/324, 346, 130, 316, 336; 455/226.1, 455/226.3; 329/300
See application file for complete search history.

(56) References Cited

U.S. PATENT DOCUMENTS 5,539,776 A * 7/1996 Subramanian ............... 375/283
5,781,588 A * 7/1998 Abe et al. .................... 375/334
6,198,908 B1 * 3/2001 Grenabo ....................... 455/44
6,873,663 B1 * 3/2005 Shipton ....................... 375/329
2003/0095201 A1 * 5/2003 Devaney et al. ......... 348/384.1

* cited by examiner

*Primary Examiner*—Khai Tran

(57) ABSTRACT

In response to a first signal having modulation representing information and a modulation index, embodiments of the present invention generate a second signal that differs from the first signal in its modulation index, and demodulate the second signal. In one embodiment, an arrangement having a signal processor is adapted to receive a first signal having modulation representing information and having a first modulation index and to generate, in response to the first signal, a second signal having frequency modulation representing the information and having a second modulation index different from the first modulation index, and a demodulator coupled to the signal processor so as to receive and demodulate the second signal. In another embodiment, a method comprises the steps of providing a first signal having modulation representing information and having a first modulation index; generating, in response to the first signal, a second signal having modulation representing the information and having a second modulation index different from the first modulation index; and demodulating the second signal.

31 Claims, 4 Drawing Sheets

PROCESSING OF MODULATED SIGNALS

BACKGROUND OF THE INVENTION

The present invention relates to processing of modulated signals, including frequency-modulated signals such as Bluetooth signals. More particularly, this invention relates to processing of modulated signals that includes processing to alter the modulation index of such signals.

Various signaling or communication systems require modulated signals with particular modulation characteristics. For instance, the Bluetooth specification requires the use of a Gaussian frequency shift keyed ("GFSK") modulation format with a modulation index, m, that is between 0.28 and 0.35. The performance of a demodulator may depend on the characteristics of the signal it demodulates. For instance, demodulators exist that have good performance with frequency shift keyed ("FSK") signals that are nearly orthogonal, i.e., that have a modulation index of about 1. The performance of such demodulators can be lower when demodulating signals with a different modulation index, such as the lower modulation index signals required by the Bluetooth standard.

SUMMARY OF THE INVENTION

In response to a first signal having modulation representing information and a modulation index, embodiments of the present invention generate a second signal that differs from the first signal in its modulation index, and demodulate the second signal.

In one embodiment, the present invention is an arrangement having a signal processor adapted to receive a first signal having modulation representing information and having a first modulation index and to generate, in response to the first signal, a second signal having frequency modulation representing the information and having a second modulation index different from the first modulation index, and a demodulator coupled to the signal processor so as to receive and demodulate the second signal.

In another embodiment, the present invention is a method comprising the steps of providing a first signal having modulation representing information and having a first modulation index; generating, in response to the first signal, a second signal having modulation representing the information and having a second modulation index different from the first modulation index; and demodulating the second signal.

BRIEF DESCRIPTION OF THE DRAWINGS

The foregoing and other aspects, features, and advantages of the present invention will become more fully apparent from the following detailed description, the appended claims, and the accompanying drawings in which:

DETAILED DESCRIPTION

Figure 1:
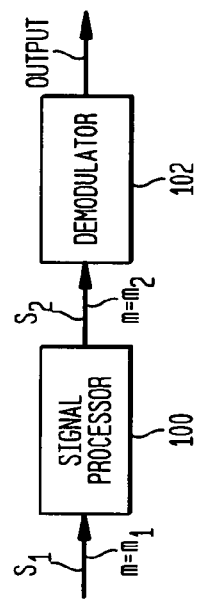
FIG. 1 is a block diagram illustrating a receiver in accordance with one embodiment of the present invention.

FIG. 1 is a block diagram illustrating a receiver circuit in accordance with one embodiment of the present invention. The receiver circuit receives, as an input signal, a first signal $S_1$ having modulation representing information and having a first modulation index $m_1$. The receiver circuit includes a signal processor 100 that generates, in response to first signal $S_1$, a second signal $S_2$ having modulation representing the information contained in $S_1$ and having a second modulation index $m_2$ that differs from $m_1$. The second signal $S_2$ is supplied as an input to demodulator 102, which demodulates $S_2$ to generate a demodulated output signal. Signal processor 100 may comprise a nonlinear circuit, for example. In accordance with this embodiment of the invention, a receiver, in response to a first signal having modulation representing information and a modulation index, generates a second signal that differs from the first signal in its modulation index, and demodulates the second signal.

Figure 2:
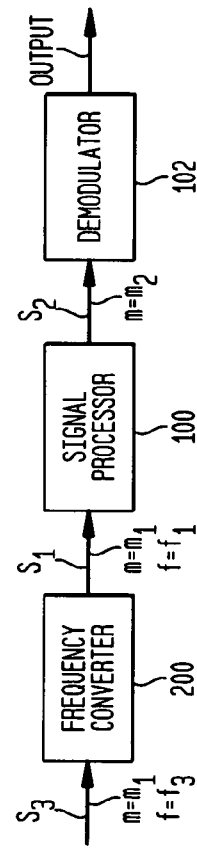
FIG. 2 is a block diagram illustrating another receiver in accordance with an alternative embodiment of the present invention.

FIG. 2 is a schematic diagram illustrating another receiver circuit in accordance with an alternative embodiment of the present invention. Elements in the various drawing figures that are the same are indicated by the same reference numerals. In addition to signal processor 100 and demodulator 102 as shown in FIG. 1, the receiver of FIG. 2 includes a frequency converter 200. The receiver circuit receives, as an input signal, a third signal S3 having modulation representing information, a modulation index ml, and a carrier frequency $f=f_3$. As used herein, "carrier frequency" means the frequency that is modulated by an information-containing modulating signal. Thus, as used herein the carrier frequency of a modulated transmission would be its transmission frequency; if the modulated transmission were mixed to an intermediate frequency ("IF") signal, its carrier frequency would be the intermediate frequency; and the carrier frequency of the baseband modulating signal would be zero. Frequency converter 200 processes $S_3$ to generate an output signal having the same modulation index $m_1$ but a different carrier frequency $f_1$. Frequency converter 200 may comprise a mixer, for example. The output of frequency converter 200 is supplied to signal processor 100 as its input signal $S_1$. The remainder of the circuitry of FIG. 2 functions as described above with respect to FIG. 1. In accordance with this embodiment of the invention, a receiver, in response to a third signal having modulation representing information, a carrier frequency, and a modulation index, generates a first signal that differs from the third signal in its carrier frequency, generates a second signal that differs from the first signal in its modulation index, and demodulates the second signal.

The Bluetooth standard specifies RF signals having a GFSK-modulated carrier with a modulation index between 0.28 and 0.35. The mean value of the Bluetooth modulation index range is about 0.32. FSK demodulators exist that have excellent performance. For instance, Agere Systems Inc. developed a 1-bit oversampled complex correlation demodulator architecture that was embodied in its products designated CSP1008/1009 and DSP1660 and is described in U.S. Pat. No. 6,288,618 B1. The performance of that demodulator is optimum when processing orthogonal, or nearly orthogonal, FSK signals, i.e., signals having a modulation index m 1.0. The performance of that demodulator is adversely impacted when processing relatively low modulation index signals, such as Bluetooth signals having a modulation index m≈0.32. The performance of a receiver that receives an input signal having a modulation index that is not optimum for its demodulator can be improved by providing circuitry to generate, from the received signal, another signal having a different modulation index that can be demodulated by the demodulator with better performance. For example, the above-referenced 1-bit oversampled complex correlation demodulator can be used as demodulator 102 in the receivers of FIGS. 1–3 with near optimum performance in processing Bluetooth signals supplied to the receiver, if circuitry is provided to generate an m≈1.0 signal for demodulation from the m≈0.32 received Bluetooth signal.

Figure 3:
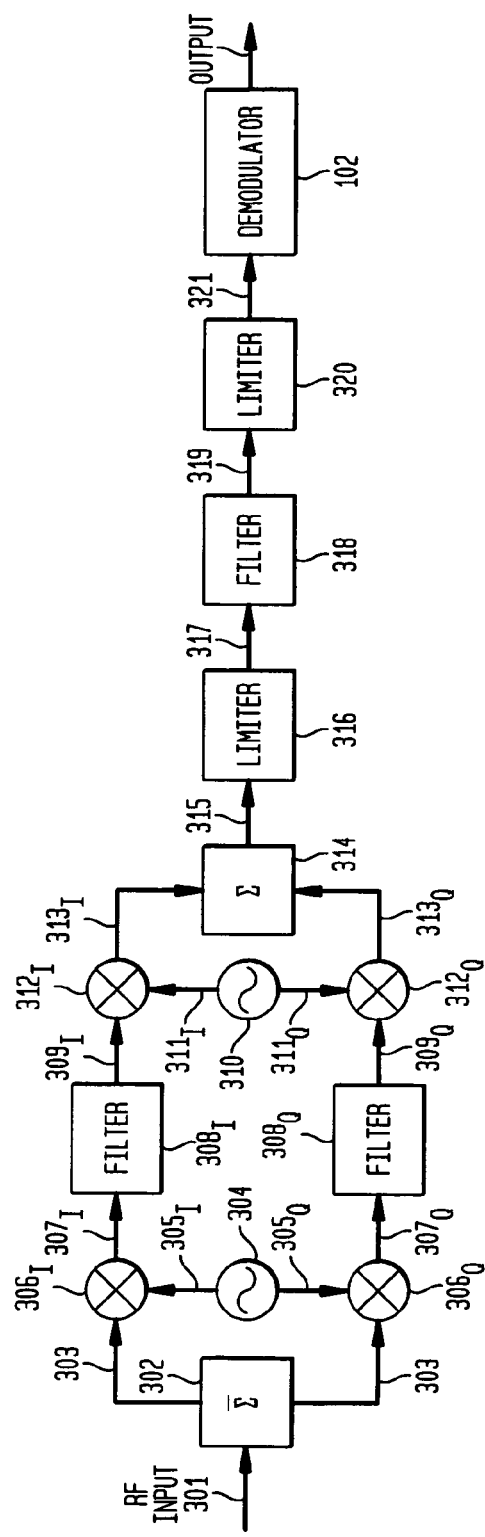
FIG. 3 is a block diagram illustrating a preferred implementation of the receiver of FIG. 2.

FIG. 3 is a block diagram illustrating a preferred implementation of the receiver of FIG. 2. Blocks 302, 304, 306, 308, 310, 312, and 314 illustrate a preferred implementation of the frequency converter 200 of FIG. 2, and blocks 316, 318, and 320 illustrate a preferred implementation of the signal processor 100 of FIG. 2. The receiver of FIG. 3 receives a radio frequency ("RF") input signal 301 at a carrier frequency that may be, for example, a GFSK-modulated signal conforming to the Bluetooth standard. The RF input 301 is split by splitter 302 into a pair of signals 303 so that the in-phase ("I") and quadrature ("Q") components of RF input 301 can be processed separately. Signals and circuit elements in FIG. 3 bear a suffix I or Q to indicate that they are, or process, in-phase or quadrature signals, respectively. Each of the split input signals 303 is supplied to the input of a mixer 306. A reference signal source 304, for example a local oscillator, generates in-phase and quadrature reference signals $305_I$ and $305_Q$ that are supplied to mixers $306_I$ and $306_Q$, respectively. Mixers $306_I$ and $306_Q$ generate in-phase and quadrature signals $307_I$ and $307_Q$, respectively, at a carrier frequency determined by the frequency of reference signal source 304. Preferably mixers 306 mix signals 303 to baseband, but alternatively signals 303 could be mixed to an intermediate frequency. Signals $307_I$ and $307_Q$ are filtered by filters $308_I$ and $308_Q$, respectively, to improve channel selectivity. Filters 308 are preferably lowpass filters if signals 303 are mixed to baseband, and bandpass filters if signals 303 are mixed to an intermediate frequency. The filtered signals $309_I$ and $309_Q$ generated by filters 308 are input to mixers $312_I$ and $312_Q$. Mixers 312 mix signals 309 to an intermediate frequency that is determined by reference signal source 310, which supplies reference signals 311 to mixers 312. The choice of intermediate frequency will generally be based on implementation-specific design considerations. The intermediate frequency in-phase and quadrature signals $313_I$ and $313_Q$ generated by mixers 312 are summed by summer 314 to generate an intermediate frequency signal 315 that is no longer in I and Q. If mixers 306 mix signals 303 to an intermediate frequency rather than to baseband, then mixers 312 and reference signal source 310 might be omitted.

Signal 315 is input to limiter 316, the output of which, signal 317, is an amplitude-limited analogue of signal 315. Limiter 316 may, for example, comprise a comparator, a diode limiter, or other circuit type depending on implementation-specific design considerations. Amplitude limiting is a type of nonlinear signal processing, and generates an output signal having components that are harmonically related to the input signal. Hard limiting by limiter 316 produces a substantially square wave signal 317 having a spectrum that is rich in odd harmonics. Each harmonic component of signal 317 is a frequency-multiplied version of the intermediate frequency signal 315. Each harmonic component of signal 317 has a frequency deviation that is larger than that of signal 315 by a factor equal to its harmonic number. However, the symbol rate of each harmonic component of signal 317 is the same as that of signal 315. Thus, each harmonic component of signal 317 has a modulation index that is larger than that of signal 315 by a factor equal to its harmonic number. Amplitude limiting provides modulation index multiplication in each harmonic component of the output. A harmonic component may be selected for demodulation in accordance with the modulation index desired in the signal to be demodulated.

If demodulator 102 is sensitive primarily to a particular component in the spectrum of signal 317, or if demodulator 102 is otherwise capable of demodulating signal 317 to provide an output signal acceptably representing the modulating information notwithstanding the harmonically-related components in signal 317, then signal 317 could be supplied directly to the input of demodulator 102 and be demodulated by it. However, to reduce adverse effects that might be caused by directly demodulating signal 317, such as effects due to the presence of a fundamental component having greater power than that of a harmonic component to be demodulated, the receiver of FIG. 3 processes signal 317 before demodulation. Filter 318 filters signal 317 to enhance the relative strength of a desired harmonic component in the filter output signal 319. Filter 318 may, for example, be a bandpass filter having a passband preferentially passing a particular harmonic component present in signal 317. Filter 318 may also, for example, be a high pass filter preferentially attenuating frequencies below a particular harmonic present in signal 317. Limiter 320, which may for example be a self-biasing comparator, processes filtered signal 319 to provide a controlled-amplitude input signal 321 to demodulator 102.

If RF input 301 is a Bluetooth-modulated RF signal, either as transmitted or as mixed to an intermediate frequency, it will have a modulation index that is nominally about 0.32. If the third harmonic of intermediate frequency signal 315 is selected by filter 318, then the input signal 321 to demodulator 102 will have a modulation index that is nominally about (0.32*3) or about 0.96. This is close to the optimum modulation index of the above-referenced 1-bit oversampled complex correlation demodulator, and so the circuitry of FIG. 3 can process Bluetooth modulated signals to enable improved demodulation performance by such a demodulator.

The mixing of the filtered baseband signals 309 back up to an intermediate frequency allows AC coupling between circuit elements (i.e., AC signals are coupled between DC-isolated circuit elements) and hard limiting in the subsequent stages, which is an advantage because it minimizes the DC offset problems inherent in DC coupled direct conversion receiver architectures. AC coupling may be employed between any circuit elements processing signals after they have been mixed to I and Q components, for example, between mixers 312 and summer 314, and/or between summer 314 and limiter 316.

FIGS. 4–8 are graphs illustrating spectra of signals that may be present in a receiver according to FIG. 3. The spectral plots of FIGS. 4–8 were generated by computer simulation using TESLA simulation software.

Figure 4:
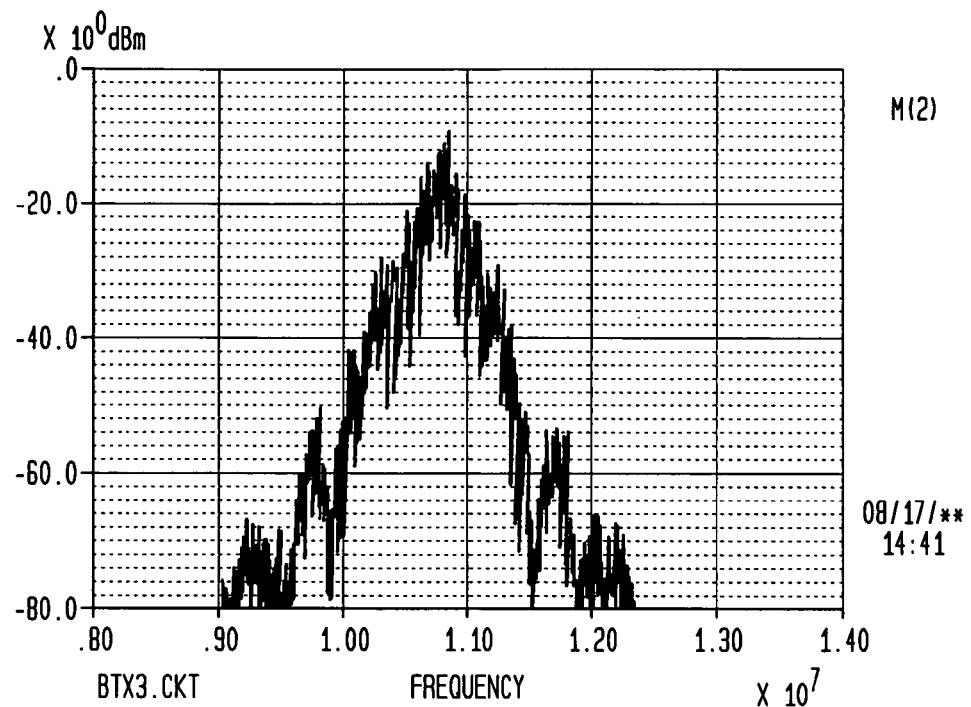
FIG. 4 is a graph illustrating the spectrum of a frequency-modulated signal at a first carrier frequency.

FIG. 4 is a plot of a GFSK signal spectrum at an arbitrarily-selected frequency of 10.7 MHz, with a time-bandwidth product ("BT") of 0.5 and modulation index of 0.32, which is representative of the spectrum of a Bluetooth signal. The symbol rate of the signal is 1 megabit per second. The discussion below of FIGS. 5–8 assumes that such a signal is presented as RF input 301.

Figure 5:
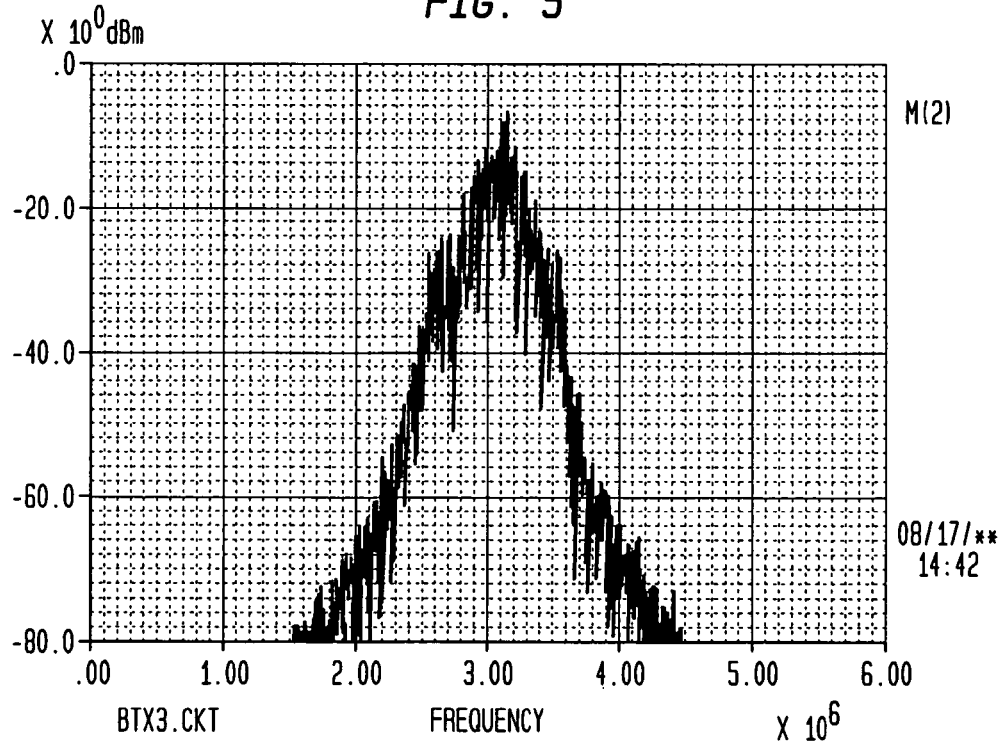
FIG. 5 is a graph illustrating the spectrum of a frequency-modulated signal at a second carrier frequency.

FIG. 5 is a plot of the signal spectrum of signals 313 resulting from mixing filtered baseband signals 309 up to an arbitrarily-selected intermediate frequency of 3 MHz. Because of the low modulation index, 0.32, the spectrum of FIG. 5 lacks distinct FSK tone peaks. Signal 315, the summed intermediate frequency in-phase and quadrature signals 313, would also have a spectrum as shown in FIG. 5.

Figure 6:
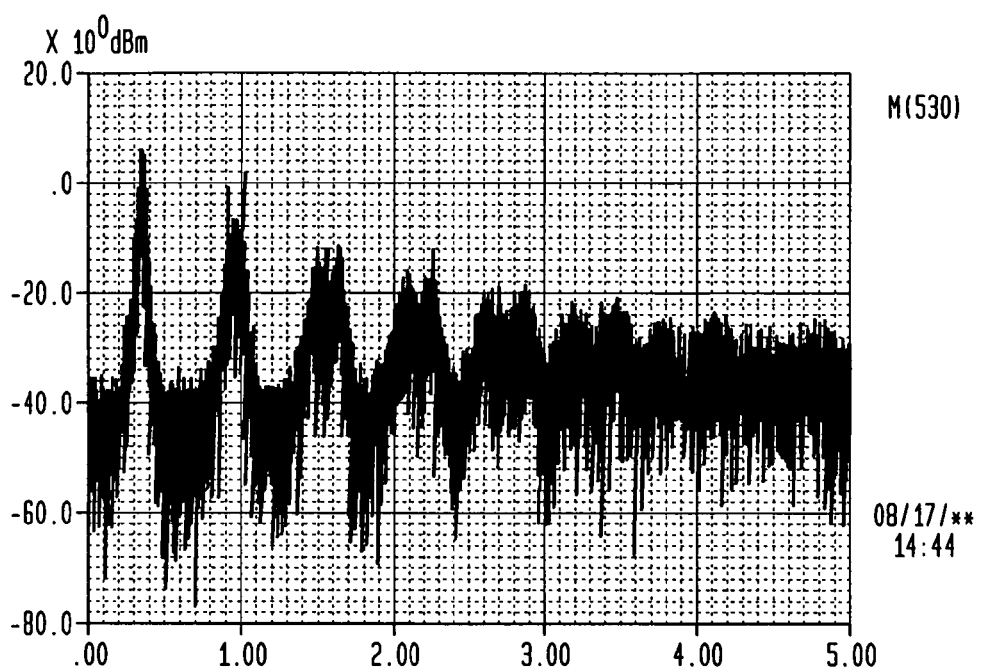
FIG. 6 is a graph illustrating the spectrum resulting from amplitude limiting the signal of FIG. 5.

FIG. 6 is a plot of the signal spectrum of signal 317 resulting from limiting the 3-MHz IF signal 315. The simulation modeled limiter 316 as a simple comparator that "slices" the 3-MHz IF to a square wave. This produces odd harmonics, of which for example the third, fifth, and seventh can be seen centered at 9 MHz, 15 MHz, and 21 MHz, respectively. The modulation index of each of these harmonic components of signal 317 is higher than that of the fundamental by a factor equal to its harmonic number.

As noted above, instead of bandpass filtering to select a particular harmonic for demodulation, a signal such as that of FIG. 6 might be directly demodulated or high pass filtered and then demodulated. In either case, the signal presented to the demodulator would have several components with different modulation indices, including, if no filtering were done to remove the fundamental, a component with the same modulation index as that of the input. It should be understood that in the terminology used herein, a signal such as that of FIG. 6 is a second signal, having a modulation index different from that of the first signal in response to which it was generated, if it includes a component that has a modulation index different from that of the first signal, and that component is demodulated.

Figure 7:
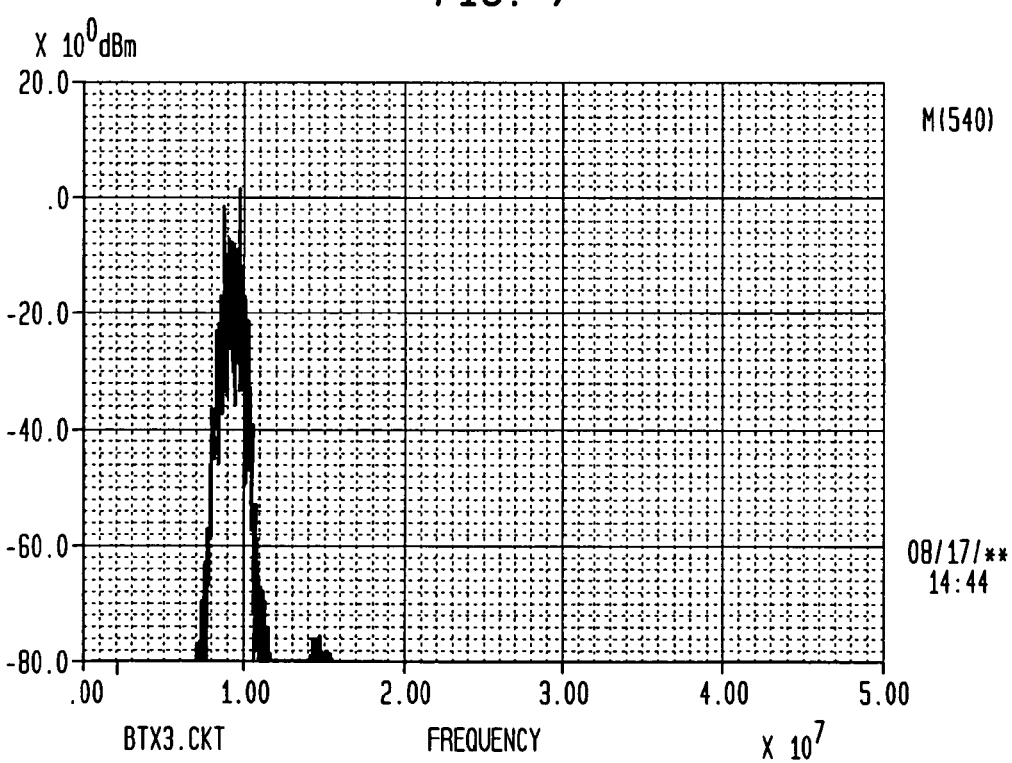
FIG. 7 is a graph illustrating the spectrum resulting from filtering the signal of FIG. 6.

FIG. 7 is a plot of the signal spectrum of signal 319 resulting from filtering the output of limiter 316. The simulation modeled filter 318 as a 3-pole Chebyshev filter with passband centered at 9 MHz and a passband ripple of 1.0 dB. The plot of FIG. 7 is at the same scale as the plot of FIG. 6.

Figure 8:
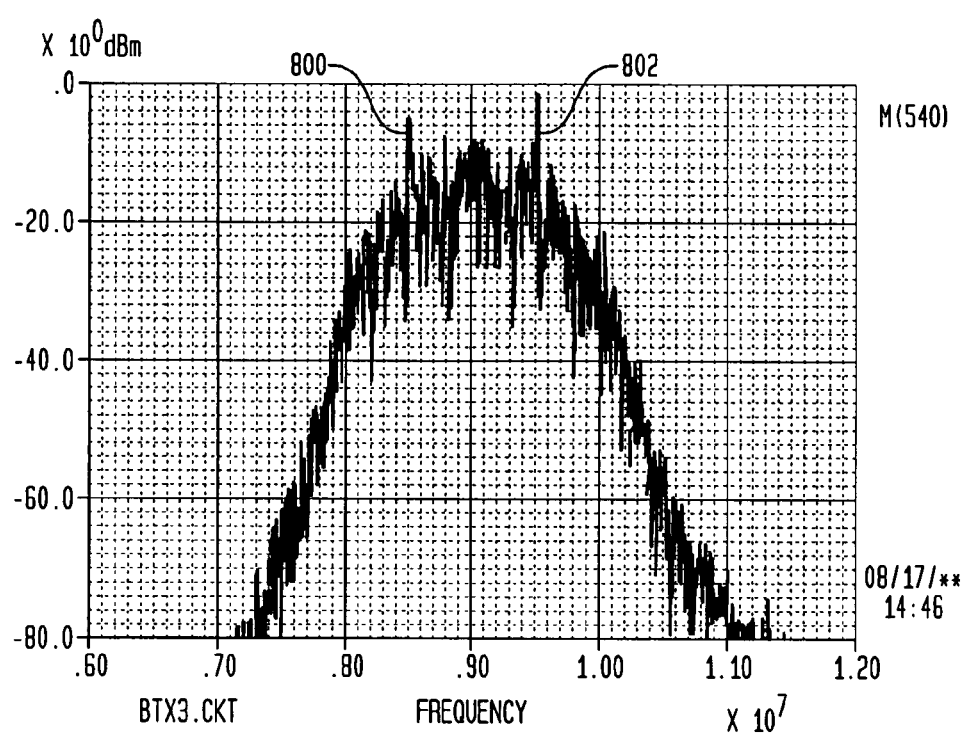
FIG. 8 is a graph illustrating in greater detail a portion of the spectrum of FIG. 7.

FIG. 8 is also a plot of the signal spectrum of signal 319 resulting from filtering the output of limiter 316. The plot of FIG. 8 is at a different scale than the plot of FIG. 7 to provide a closer, zoomed-in view of the spectrum shown in FIG. 7. FIG. 8 shows more clearly the distinct tone peaks at 9±0.5 MHz (tone peak 800 at 8.5 MHz and tone peak 802 at 9.5 MHz), indicating a nearly orthogonal FSK signal. This spectrum can be processed efficiently and with good performance by demodulators such as the previously described 1-bit oversampled complex correlation demodulator.

It will be understood that limiters other than hard limiters may be used to provide outputs other than square waves having different harmonic content, and that nonlinear circuits other than limiters can be used to provide outputs having a modulation index different from their inputs. It will also be understood that embodiments of the invention may be used to process signals having modulation indices other than those of Bluetooth signals to yield signals for demodulation having modulation indices other than about 1. For example, to process a signal having a modulation index of 0.1 to provide a signal for demodulation having a modulation index of 0.5, the fifth harmonic may be generated and selected. Subharmonics of a signal may be generated and selected in order to provide a signal for demodulation with a reduced modulation index. Signals may also be generated for demodulation that are not harmonically related to received signals; the modulation indices of the received signal and the demodulated signal may differ other than by an integer factor Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method comprising the steps of:
   (a) providing a first signal having modulation representing information and having a first modulation index;
   (b) generating, in response to the first signal, a second signal having modulation representing the information and having a second modulation index different from the first modulation index; and
   (c) demodulating the second signal, wherein:
      step (a) includes receiving a third signal having FSK modulation and mixing the third signal to an intermediate frequency to provide the first signal;
      step (b) includes processing the first signal in a nonlinear circuit including an amplitude limiter and filtering the output of the nonlinear circuit to enhance the relative strength of the output's third harmonic component; and
      step (c) includes demodulating the third harmonic component.

2. The invention of claim 1, wherein the third signal is a baseband signal.

3. The invention of claim 1, wherein the third signal has a nonzero carrier frequency.

4. Apparatus comprising:
   (a) a frequency converter adapted to convert a third signal to an intermediate frequency signal, wherein the frequency converter includes a first mixer adapted to mix the third signal to a baseband signal and a second mixer adapted to mix the baseband signal to the intermediate frequency signal;
   (b) a signal processor coupled to receive, from the frequency converter, a first signal comprising the intermediate frequency signal and having modulation representing information and having a first modulation index and to generate, in response to the first signal, a second signal having frequency modulation representing the information and having a second modulation index different from the first modulation index; and
   (c) a demodulator coupled to the signal processor so as to receive and demodulate the second signal.

5. The invention of claim 4, wherein the signal processor includes a nonlinear circuit.

6. The invention of claim 5, wherein the nonlinear circuit includes an amplitude limiter.

7. The invention of claim 5, wherein the signal processor includes a filter arranged to filter the output of the nonlinear circuit.

8. The invention of claim 4, wherein the second signal is harmonically related to the first signal.

9. The invention of claim 4, wherein the second modulation index is about 1 and the ratio of the second modulation index to the first modulation index is about 3.

10. The invention of claim 4, wherein the modulation of the first signal is FSK modulation.

11. The invention of claim 4, wherein the signal processor includes an amplitude limiter and a filter arranged to filter the output of the amplitude limiter to enhance the relative strength of the output's third harmonic component, and the demodulator is an FSK demodulator demodulating the third harmonic component.

12. A method comprising:
   (a) providing a first signal having modulation representing information and having a first modulation index;
   (b) hard limiting the first signal to generate one or more components that are harmonically related to the first signal, wherein the one or more components comprise a second signal having modulation representing the information and having a second modulation index different from the first modulation index; and
   (c) demodulating the second signal.

13. The invention of claim 12, wherein step (b) comprises applying the first signal to an amplitude limiter to generate the one or more components.

14. The invention of claim 12, wherein step (b) further comprises filtering the one or more components to select the second signal.

15. The invention of claim 14, wherein the filtering is bandpass filtering corresponding to the frequency of the second signal.

16. The invention of claim 14, wherein step (b) further comprises limiting the selected second signal.

17. The invention of claim 16, wherein the limiting is implemented using a self-biasing comparator.

18. The invention of claim 12, wherein the first signal is provided by frequency-converting a third signal.

19. The invention of claim 18, wherein:
   the first signal is an intermediate frequency (IF) signal; and
   the third signal is frequency down-converted to generate the first signal.

20. The invention of claim 19, wherein:
   the third signal is frequency down-converted to baseband to generate a baseband signal; and
   the baseband signal is frequency up-converted to IF to generate the first signal.

21. The invention of claim 12, wherein:
   the first signal is an IF signal;
   a third signal is frequency down-converted to baseband to generate a baseband signal;
   the baseband signal is frequency up-converted to IF to generate the first signal; and
   step (b) comprises:
      applying the first signal to an amplitude limiter to generate the one or more components;
      bandpass filtering the one or more components to select the second signal; and
      limiting the selected second signal.

22. Apparatus comprising:
   a signal processor adapted to (1) receive a first signal having modulation representing information and having a first modulation index and (2) hard limit the first signal to generate one or more components that are harmonically related to the first signal, wherein the one or more components comprise a second signal having modulation representing the information and having a second modulation index different from the first modulation index; and
   a demodulator coupled to the signal processor so as to receive and demodulate the second signal.

23. The invention of claim 22, wherein the signal processor comprises an amplitude limiter adapted to generate the one or more components from the first signal.

24. The invention of claim 22, wherein the signal processor comprises a filter adapted to filter the one or more components to select the second signal.

25. The invention of claim 24, wherein the filter is a bandpass filter corresponding to the frequency of the second signal.

26. The invention of claim 24, wherein the signal processor further comprises a limiter adapted to limit the selected second signal.

27. The invention of claim 26, wherein the limiter is a self-biasing comparator.

28. The invention of claim 22, further comprising a frequency converter adapted to provide the first signal by frequency-converting a third signal.

29. The invention of claim 28, wherein:
   the first signal is an IF signal; and
   the frequency converter is adapted to frequency down-convert the third signal to generate the first signal.

30. The invention of claim 29, wherein the frequency converter comprises:
   a first mixer adapted to frequency down-convert the third signal to baseband to generate a baseband signal; and
   a second mixer adapted to frequency up-convert the baseband signal to IF to generate the first signal.

31. The invention of claim 22, wherein:
   the first signal is an IF signal;
   the frequency converter comprises:
      a first mixer adapted to frequency down-convert a third signal to baseband to generate a baseband signal; and
      a second mixer adapted to frequency up-convert the baseband signal to IF to generate the first signal;
   the signal processor comprises:
      an amplitude limiter adapted to generate the one or more components from the first signal;
      a bandpass filter adapted to filter the one or more components to select the second signal for the demodulator; and
      a limiter adapted to limit the selected second signal.

* * * * *